United States Patent
Eum et al.

(10) Patent No.: US 10,231,295 B2
(45) Date of Patent: Mar. 12, 2019

(54) MULTIPLE LINEAR REGULATION

(71) Applicant: FAIRCHILD KOREA SEMICONDUCTOR, LTD., Bucheon, Gyeonggi-do (KR)

(72) Inventors: Hyun-Chul Eum, Bucheon (KR); Young-Jong Kim, Seoul (KR)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 37 days.

(21) Appl. No.: 15/604,137

(22) Filed: May 24, 2017

(65) Prior Publication Data

US 2017/0354002 A1 Dec. 7, 2017

Related U.S. Application Data

(60) Provisional application No. 62/344,780, filed on Jun. 2, 2016, provisional application No. 62/422,980, filed on Nov. 16, 2016.

(51) Int. Cl.
*H05B 33/08* (2006.01)

(52) U.S. Cl.
CPC ..... *H05B 33/0809* (2013.01); *H05B 33/0845* (2013.01)

(58) Field of Classification Search
CPC ............ H05B 33/0809; H05B 33/0845
See application file for complete search history.

(56) References Cited

U.S. PATENT DOCUMENTS

| | | | | |
|---|---|---|---|---|
| 2010/0308738 A1* | 12/2010 | Shteynberg | ........ | H05B 33/0812 315/185 R |
| 2012/0229030 A1* | 9/2012 | Moskowitz | ........ | H05B 33/0809 315/122 |
| 2013/0026925 A1* | 1/2013 | Ven | ..... | H05B 33/0824 315/122 |
| 2013/0200802 A1* | 8/2013 | Sakuragi | ........ | H05B 37/02 315/122 |
| 2013/0307423 A1* | 11/2013 | Lee | ...... | H05B 33/083 315/186 |
| 2016/0007420 A1* | 1/2016 | Gong | ........ | H05B 33/0815 315/187 |

* cited by examiner

*Primary Examiner* — Seokjin Kim
(74) *Attorney, Agent, or Firm* — AMPACC Law Group, PLLC

(57) ABSTRACT

A circuit comprises an amplifier and a plurality of channels, the plurality of channels including respective transistors. The respective transistors of the channels control respective magnitudes of respective currents of the channels according to an output of the amplifier. The respective transistors of the plurality of channels may be included in an auto-commutated circuit. A first Light Emitting Diode (LED) circuit may be coupled between a power source and a first channel of the plurality of channels. A second LED circuit may be coupled between the first channel and a second channel of the plurality of LED channels. The power source may provide rectified Alternating Current (AC).

9 Claims, 8 Drawing Sheets

$V(D1) > V(D2) > V(D3) > V(D4) \geq 0$

BIAS4 > BIAS3 > BIAS2 > BIAS1

MULTIPLE LINEAR REGULATION

CROSS-REFERENCE TO RELATED APPLICATIONS

This present disclosure claims the benefit of U.S. Provisional Application No. 62/344,780, filed on Jun. 2, 2016, and U.S. Provisional Application No. 62/422,980, filed on Nov. 16, 2016, which are incorporated by reference herein in their entirety.

FIELD OF THE DISCLOSURE

The present disclosure relates generally to power control circuits, and more particularly to power control in Direct Alternating Current Drive (DACD) Light Emitting Diode (LED) circuits.

BACKGROUND

The present disclosure relates, in general, to electronics, and more particularly, to circuits and method for powering Light Emitting Diodes (LEDs) from Alternating Current (AC) power supplies. In the past, such circuits used power conversion circuits, such as Switched Mode Power Supplies (SMPS), to convert the AC power before supplying it to the LEDs.

Alternatively, Direct Alternating Current Drive (DACD) LED systems provide the AC power to the LEDs without conversion. DACD LED systems can be simpler, smaller, and have fewer components than SMPS systems, while still achieving high efficiencies, good power factors, and low Total Harmonic Distortion (THD). In addition, DACD LED systems may be compatible with a variety of dimming techniques, such as phase-cut dimming, analog dimming, and Pulse Width Modulation (PWM) dimming.

Accordingly, it is desirable to develop cost-effective DACD LED systems.

BRIEF DESCRIPTION OF THE FIGURES

In the accompanying figures, like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

Those skilled in the field of the present disclosure will appreciate that elements in the figures are illustrated for simplicity and clarity and have not necessarily been drawn to scale. For example, the dimensions of some of the elements in the figures may be exaggerated relative to other elements to help to improve understanding of the embodiments.

The apparatus and method components have been represented where appropriate by conventional symbols in the drawings, showing only those specific details that are pertinent to understanding the embodiments. This avoids obscuring the disclosure with details that will be readily apparent to those of ordinary skill in the art having the benefit of the disclosures herein. The details of well-known elements, structures, or processes that are necessary to practice the embodiments and that are well known to those of skill in the art may not be shown and should be assumed present unless otherwise indicated.

DETAILED DESCRIPTION

The present disclosure relates generally to electronics, and more particularly, to circuits and method for powering Light Emitting Diodes (LEDs) from Alternating Current (AC) power supplies. In particular, the disclosure relates to Direct AC Drive (DACD) LED circuits that use a shunt topology. The present disclosure also relates to controlling currents in a plurality of channels of a circuit using a single amplifier.

Embodiments provide, among other advantages, reduced circuit complexity and cost, and reduced harmonic distortion in the current flowing through the LEDs.

In one embodiment, a circuit comprises a plurality of channels including respective transistors. The circuit also comprises an amplifier. Respective currents of the channels are controlled using the respective transistor of the channels and according to an output of the amplifier. The channels may be LED channels, and LED circuits may be connected between a power supply and a first channel and between successive channels. The amplifier may produce the output according to a difference between a current through the channels and a target current. The circuit may be a Direct AC Drive (DACD) LED circuit.

In the following detailed description, certain illustrative embodiments have been illustrated and described. As those skilled in the art would realize, these embodiments may be modified in various different ways without departing from the scope of the present disclosure. Accordingly, the drawings and description are to be regarded as illustrative in nature and not restrictive. Similar reference numerals designate similar elements in the specification.

Figure 1A:
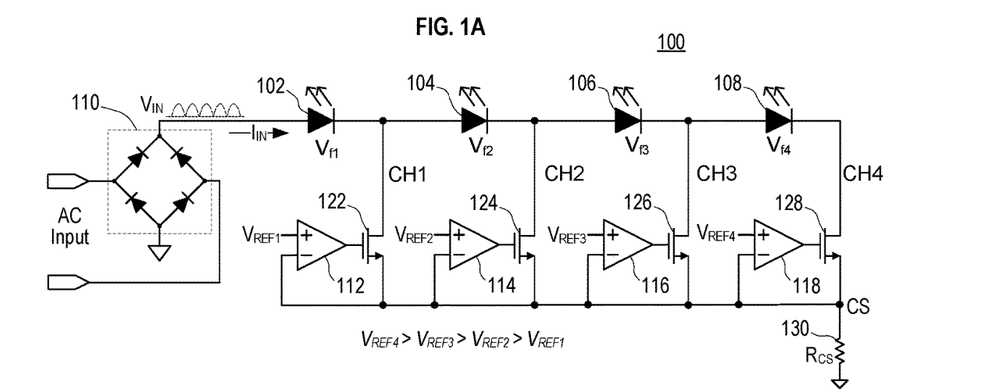
FIG. 1A illustrates a DACD LED circuit.

FIG. 1A illustrates a DACD LED circuit 100 having a shunt topology. The DACD LED circuit 100 includes a full-wave rectifier bridge 110, first, second, third, and fourth LEDs 102, 104, 106, and 108, first, second, third, and fourth differential amplifiers 112, 114, 116, and 118, and first, second, third, and fourth control transistors 122, 124, 126, and 128. The DACD LED circuit 100 further includes a Current Sense (CS) resistor 130.

Input terminals of the full-wave rectifier bridge 110 are connected to an AC power source. In embodiments, the AC power source has a Root-Mean-Square (RMS) voltage of between 100 and 240 volts, but embodiments are not limited thereto. A negative output terminal of the full-wave rectifier bridge 110 is connected to a circuit ground.

The first, second, third, and fourth LEDs 102, 104, 106, and 108 are coupled in series, with the cathode of the first LED 102 coupled to the anode of the second LED 104, the cathode of the second LED 104 coupled to the anode of the third LED 103, and the cathode of the third LED 106 coupled to the anode of the fourth LED 108. The anode of the first LED 102 is connected to a positive output terminal of the full-wave rectifier bridge 110.

The first, second, third, and fourth LEDs 102, 104, 106, and 108 have respective first, second, third, and fourth forward voltage drops $V_{f1}$, $V_{f2}$, $V_{f3}$, and $V_{f4}$. In an embodiment, the first to fourth LEDS 102 to 108 respectively consist of a plurality of LEDs connected in series. In an embodiment, the first, second, third, and fourth forward voltage drops $V_{f1}$, $V_{f2}$, $V_{f3}$, and $V_{f4}$ are each in the range of 40 to 70 volts, but embodiments are not limited thereto. The first, second, third, and fourth forward voltage drops $V_{f1}$, $V_{f2}$, $V_{f3}$, and $V_{f4}$ may have different values from each other or may all have a same value.

The cathodes of the first, second, third, and fourth LEDs 102, 104, 106, and 108 are connected to first conduction terminals (e.g. drain terminals) of the first, second, third, and fourth control transistors 122, 124, 126, and 128, respectively. Second conduction terminals (e.g., source terminals) of the first, second, third, and fourth control transistors 122, 124, 126, and 128 are coupled to each other and to a first terminal of the CS resistor 130 at a current sense node CS. A second terminal of the CS resistor 130 is coupled to the circuit ground.

In an embodiment, the control transistors 122, 124, 126, and 128 are Metal Oxide Semiconductor Field Effect Transistors (MOSFETs) such as the n-channel MOSFETs shown in FIG. 1A, but embodiments are not limited thereto. In other embodiments, the control transistors 122, 124, 126, and 128 may each include one or more of n-channel MOSFETs, p-channel MOSFETs, Junction FETs, bipolar junction transistors, and the like.

Control terminals (e.g. gate terminals) of the first, second, third, and fourth control transistors 122, 124, 126, and 128 are connected to outputs of the first, second, third, and fourth differential amplifiers 112, 114, 116, and 118, respectively. Positive inputs of the first, second, third, and fourth differential amplifiers 112, 114, 116, and 118 are couple to first, second, third, and fourth reference voltages $V_{REF1}$, $V_{REF2}$, $V_{REF4}$, and $V_{REF4}$, respectively. Negative inputs of the first, second, third, and fourth differential amplifiers 112, 114, 116, and 118 are coupled to the current sense node CS.

In an embodiment, the fourth reference voltage $V_{REF4}$ is greater than the third reference voltage $V_{REF3}$, the third reference voltage $V_{REF3}$ is greater than the second reference voltage $V_{REF2}$, and the second reference voltage $V_{REF2}$ is greater than the first reference voltage $V_{REF1}$.

Connections to cathodes of the first, second, third, and fourth LEDs 102, 104, 106, and 108 correspond to connections in first, second, third, and fourth channels CH1, CH2, CH3, and CH4. Magnitudes of currents in the first, second, third, and fourth channels CH1, CH2, CH3, and CH4 are respectively controlled by the first, second, third, and fourth control transistors 122, 124, 126, and 128.

Operation of the DACD LED circuit 100 will be described with respect to FIG. 1B.

Figure 1B:
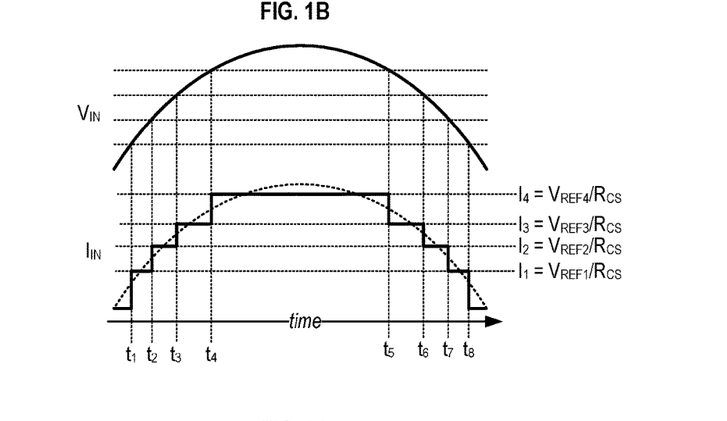
FIG. 1B is a graph illustrating voltages and current of an operation of the DACD LED circuit of FIG. 1A.

FIG. 1B is a graph illustrating voltages and current of an operation of the DACD LED circuit of FIG. 1A. FIG. 1B includes waveforms on an input voltage $V_{IN}$ and an input current $I_{IN}$ of the DACD LED circuit 100, and further illustrates first, second, third, and fourth reference current levels $I_1$, $I_2$, $I_3$, and $I_4$, respectively corresponding to currents through the CS resistor 120 that produce a voltage drop corresponding to the first, second, third, and fourth reference voltages $V_{REF1}$, $V_{REF2}$, $V_{REF4}$, and $V_{REF4}$, respectively.

When the input voltage $V_{IN}$ is less than a first forward voltage drop $V_{f1}$, such as before the first time $t_1$ and after the eighth time $t_8$ shown in FIG. 1B, the input current $I_{IN}$ is substantially zero, and a voltage value on the current sense node CS is substantially zero. As a result the outputs of the first to fourth differential amplifiers 112 to 118 are all high, and the first to fourth control transistors 122 to 124 are all turned on.

When the input voltage $V_{IN}$ is greater than the first forward voltage drop $V_{f1}$ and less than the second forward voltage drop $V_{f2}$, such as between the first time $t_1$ and the second time $t_2$ and between the seventh time $t_7$ and the eighth time $t_8$, the input current $I_{IN}$ flows through the first control transistor 122 and is controlled according to the output of the first differential amplifier 112. The input current $I_{IN}$ therefore has a value equal to the first reference current level $I_1$, that is, equal to the value of the first reference voltage $V_{REF1}$ divided by a resistance value of the CS resistor 130.

When the input voltage $V_{IN}$ is greater than a sum of the first forward voltage drop $V_{f1}$ and the second forward voltage drop $V_{f2}$ and is less than the sum of the first to third voltage drops $V_{f1}$ to $V_{f3}$, such as between the second time $t_2$ and the third time $t_3$ and between the sixth time $t_6$ and the seventh time $t_7$, the input current $L_{IN}$ flows through the second control transistor 124 and is controlled according to the output of the second differential amplifier 114. The input current $I_{IN}$ therefore has a value equal to the second reference current level $I_2$, that is, equal to the value of the second reference voltage $V_{REF2}$ divided by a resistance value of the CS resistor 130.

Because the second reference voltage $V_{REF2}$ is greater than the first reference voltage $V_{REF1}$, the voltage value on the current sense node CS has a value greater than the first reference voltage $V_{REF1}$ when the input current $I_{IN}$ is flowing through the second control transistors 124. As a result, the first differential amplifier 112 turns off the first control transistor 122. Therefore, the first differential amplifier 112 and the first control transistor 122 do not control the input current $I_{IN}$ when the input voltage $V_{IN}$ is greater than the sum of the first forward voltage drop $V_{f1}$ and the second forward voltage drop $V_{f2}$ and is less than the sum of the first to third voltage drops $V_{f1}$ to $V_{f3}$.

When the input voltage $V_{IN}$ is greater than a sum of the first to third forward voltage drops $V_{f1}$ to $V_{f3}$ and less than the sum of the first to fourth voltage drops $V_{f1}$ to $V_{f4}$, such as between the third time $t_3$ and the fourth time $t_4$ and between the fifth time $t_5$ and the sixth time $t_6$, the input current $I_{IN}$ flows through the third control transistor 126 and is controlled according to the output of the third differential amplifier 116. The input current $I_{IN}$ therefore has a value equal to the third reference current level $I_3$, that is, equal to the value of the third reference voltage $V_{REF3}$ divided by a resistance value of the CS resistor 130.

Because the third reference voltage $V_{REF2}$ is greater than each of the first and second reference voltages $V_{REF1}$ and $V_{REF2}$, the voltage value on the current sense node CS has a value greater than each of the first reference voltages $V_{REF1}$ and $V_{REF2}$ when the input current $I_{IN}$ is flowing through the third control transistors 126. As a result, the first and second differential amplifiers 112 and 114 turn off the first and second control transistor 122 and 124, respectively. Therefore, the first and second differential amplifiers 112 and 114 and the first and second control transistor 122 and 124 do not control the input current $I_{IN}$ when the input voltage $V_{IN}$ is greater than the sum of the first to third forward voltage drops $V_{f1}$ to $V_{f3}$ and less than the sum of the first to fourth voltage drops $V_{f1}$ to $V_{f4}$.

When the input voltage $V_{IN}$ is greater than the sum of the first to fourth voltage drops $V_{f1}$ to $V_{f4}$, such as between the fourth time $t_4$ and the fifth time $t_5$, the input current $I_{IN}$ flows through the fourth control transistor 128 and is controlled according to the output of the fourth differential amplifier 118. The input current $I_{IN}$ therefore has a value equal to the fourth reference current level $I_4$, that is, equal to the value of the fourth reference voltage $V_{REF4}$ divided by a resistance value of the CS resistor 130.

Because the fourth reference voltage $V_{REF4}$ is greater than each of the first to third reference voltages $V_{REF1}$ to $V_{REF3}$, the voltage value on the current sense node CS has a value greater than each of the first to third reference voltages $V_{REF1}$ to $V_{REF3}$ when the input current $I_{IN}$ is flowing through the fourth control transistors 128. As a result, the first to third differential amplifiers 112 to 116 turn off the first to third control transistor 122 to 126, respectively. Therefore, the first to third differential amplifiers 112 to 116 and the first to third control transistor 122 to 126 do not control the input current $I_{IN}$ when the input voltage $V_{IN}$ is greater than the sum of the first to fourth forward voltage drops $V_{f1}$ to $V_{f4}$.

Thus, in each of the voltage regions of the input voltage $V_{IN}$ corresponding to voltage intervals between consecutive sequential sums of the first to fourth forward voltage drops $V_{f1}$ to $V_{f4}$ (i.e., $V_{f1}<V_{IN}<V_{f1}+V_{f2}$, $V_{f1}+V_{f2}<V_{IN}<V_{f1}+V_{f2}+V_{f3}$, $V_{f1}+V_{f2}+V_{f3}<V_{IN}<V_{f1}+V_{f2}+V_{f3}+V_{f4}$, and $V_{f1}+V_{f2}+V_{f3}+V_{f4}<V_{IN}$), the input current 6 is controlled by a different respective one of the first to fourth differential amplifiers 112 to 118.

FIGS. 2A, 2B, 2C, and 2D illustrate a DACD LED circuit 200 according to an embodiment and the operation thereof. The DACD LED circuit 200 includes a full-wave rectifier bridge 210, first, second, third, and fourth LEDs 202, 204, 206, and 208, a differential amplifier 212, and an auto-commutated control circuit 220 (hereinafter, control circuit 220). The DACD LED circuit 200 further includes a Current Sense (CS) resistor 230 coupled between a current sense node CS and a circuit ground. Some features and characteristics that the DACD LED circuit 200 has in common with the DACD LED circuit 100 of FIG. 1 are omitted in the interest of brevity.

Figure 2A:
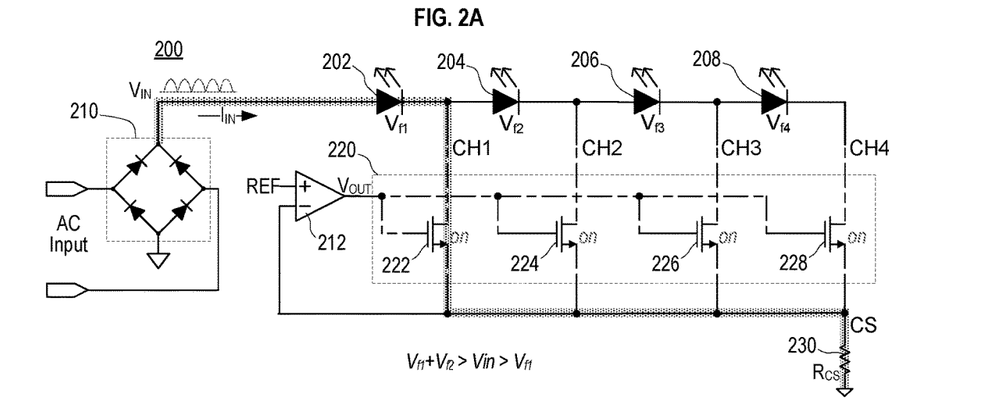
FIGS. 2A, 2B, 2C, and 2D illustrate a DACD LED circuit according to an embodiment and the operation thereof.

The first, second, third, and fourth LEDs 202, 204, 206, and 208 are coupled in series, with the cathode of the first LED 202 coupled to the anode of the second LED 204, the cathode of the second LED 204 coupled to the anode of the third LED 203, and the cathode of the third LED 206 coupled to the anode of the fourth LED 208. The anode of the first LED 202 is connected to a positive output terminal (an input voltage $V_{IN}$) of the full-wave rectifier bridge 210. A negative output terminal of the full-wave rectifier bridge 210 is coupled to the circuit ground.

The control circuit 220 includes first, second, third, and fourth control transistors 222, 224, 226, and 228. Control terminals (e.g., gates) of the first, second, third, and fourth control transistors 222, 224, 226, and 228 are each coupled to the amplifier output $V_{OUT}$ of the differential amplifier 212 by circuits within the control circuit 220. First conduction terminals (e.g., drains) of the first, second, third, and fourth control transistors 222, 224, 226, and 228 are respectively coupled to cathodes of the first, second, third, and fourth LEDs 202, 204, 206, and 208 by the circuits within the control circuit 220. Second conduction terminals (e.g., sources) of the first, second, third, and fourth control transistors 222, 224, 226, and 228 are each coupled to the current sense node CS by the circuits within the control circuit 220.

A negative input of the differential amplifier 212 is coupled to the current sense node CS. A positive input of the differential amplifier 212 is coupled to a reference voltage REF. A value of the amplifier output $V_{OUT}$ corresponds to the amount by which a voltage value of the current sense node CS is less than a voltage value of the reference voltage REF.

In an embodiment, the reference voltage REF is a Direct Current (DC) voltage.

In another embodiment, the reference voltage REF is an AC voltage (for example, a signal corresponding to a sinusoidal waveform, such as a rectified sinusoidal waveform) derived from the input voltage $V_{IN}$.

The circuits within the control circuit 220 (not shown in FIGS. 2A-2D) select which of the first, second, third, and fourth control transistors 222, 224, 226, and 228 is used to control a magnitude of the input current $I_{IN}$, according to the input voltage $V_{IN}$, the amplifier output $V_{OUT}$, and first to fourth forward voltage drops $V_{f1}$ to $V_{f4}$. The differential amplifier 212, the control transistor selected by the control circuit 220, and the CR resister 230 are components of a negative feedback loop that regulates the input current $I_{IN}$.

Connections to cathodes of the first, second, third, and fourth LEDs 202, 204, 206, and 208 correspond to connections in first, second, third, and fourth channels CH1, CH2, CH3, and CH4. Magnitudes of currents in the first, second, third, and fourth channels CH1, CH2, CH3, and CH4 are respectively controlled by the first, second, third, and fourth control transistors 222, 224, 226, and 228 according to the voltage value of the amplifier output $V_{OUT}$.

Embodiments of the circuits within the control circuit 220 will be described in the figured following FIGS. 2A-2D.

FIG. 2A illustrates operation of the DACD LED circuit 200 when the input voltage $V_{IN}$ is sufficient to forward bias the first LED 202 but insufficient to forward bias both the first LED 202 and the second LED 204 (i.e. $V_{IN}>V_{f1}$ and $V_{IN}<V_{f1}+V_{f2}>V_{IN}$). All of the first to fourth control transistors 222 to 228 are turned on by the circuits of the control circuit 220, so that the input current $I_{IN}$ only flows through the first control transistor 222. As a result, the magnitude of the input current $I_{IN}$ is controlled by the first control transistor 222 according to the amplifier output $V_{OUT}$ when $V_{IN}>V_{f1}$ and $V_{IN}<V_{f1}+V_{f2}>V_{IN}$.

Figure 2B:
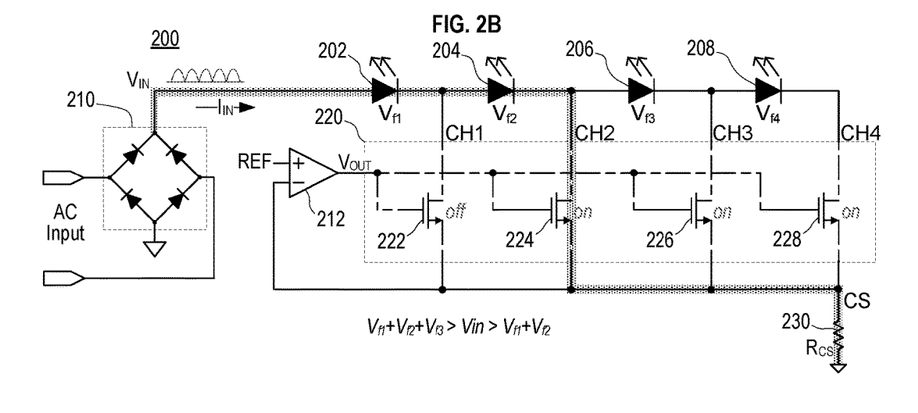

FIG. 2B illustrates operation of the DACD LED circuit 200 when the input voltage $V_{IN}$ is sufficient to forward bias both the first LED 202 and the second LED 204 but insufficient to forward bias all of the first to third LEDs 202 to 206 (i.e. $V_{IN}>V_{f1}+V_{f2}$ and $V_{IN}<V_{f1}+V_{f2}\pm V_{f3}$). The first control transistor 222 is turned off and all of the second to fourth control transistors 224 to 228 are turned on by the circuits of the control circuit 220, so that the input current $I_{IN}$ only flows through the second control transistor 224. As a result, the magnitude of the input current $I_{IN}$ is controlled by the second control transistor 224 according to the amplifier output $V_{OUT}$ when $V_{IN}>V_{f1}+V_{f2}$ and $V_{IN}<V_{f1}+V_{f2}+V_3$.

Figure 2C:
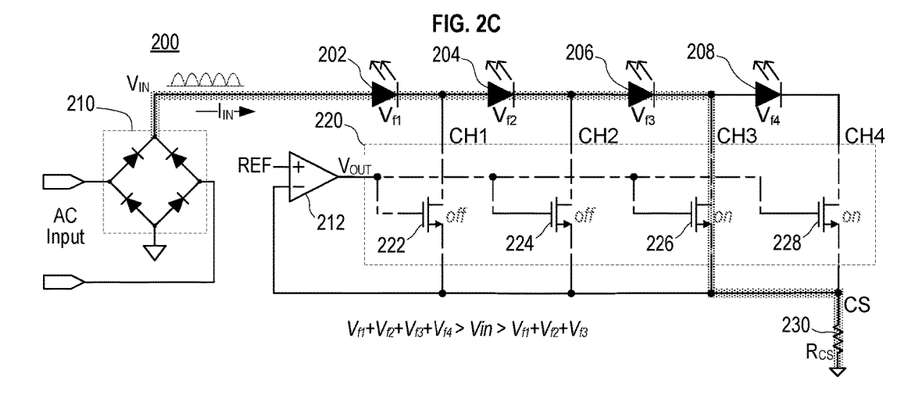

FIG. 2C illustrates operation of the DACD LED circuit 200 when the input voltage $V_{IN}$ is sufficient to forward bias all of the first to third LEDs 202 to 206 but insufficient to forward bias all of the first to fourth LEDs 202 to 208 (i.e. $V_{IN}>V_{f1}+V_{f2}+V_{f3}$ and $V_{IN}<V_{f1}+V_{f2}+V_{f3}+V_{f4}$). The first and second control transistors 222 and 224 are turned off and the third and fourth control transistors 226 and 228 are turned on by the circuits of the control circuit 220, so that the input current $I_{IN}$ only flows through the third control transistor 226. As a result, the magnitude of the input current $I_{IN}$ is controlled by the third control transistor 226 according to the amplifier output $V_{OUT}$ when $V_{IN}>V_{f1}+V_{f2}+V_{f3}$ and $V_{IN}<V_{f1}+V_{f2}+V_{f3}\pm V_{f4}$.

Figure 2D:
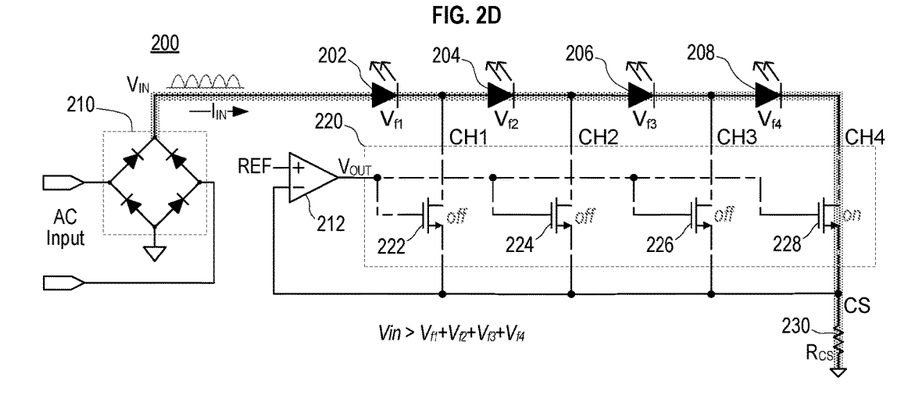

FIG. 2D illustrates operation of the DACD LED circuit 200 when the input voltage $V_{IN}$ is sufficient to forward bias all of the first to fourth LEDs 202 to 208 (i.e. $V_{IN}>V_{f1}+V_{f2}+V_{3}+V_{f4}$). The first to third control transistor 222 to 226 are turned off and the fourth control transistor 228 is turned on by the circuits of the control circuit 220, so that the input current $I_{IN}$ only flows through the fourth control transistor 228. As a result, the magnitude of the input current $I_{IN}$ is controlled by the fourth control transistor 228 according to the amplifier output $V_{OUT}$ when $V_{IN}>V_{f1}\pm V_{f2}+V_{f3}\pm V_{f4}$.

Figure 3:
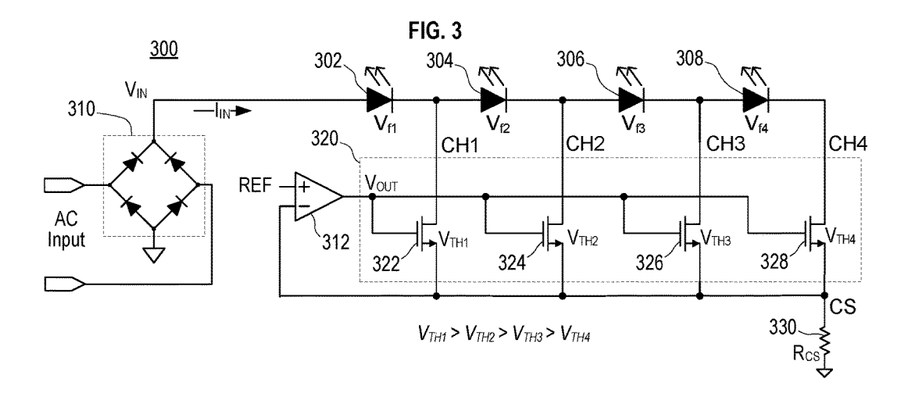
FIG. 3 illustrates a DACD LED circuit according to an embodiment.

FIG. 3 illustrates a DACD LED circuit 300 according to an embodiment. Elements of FIG. 3 correspond to respective like-numbered elements in FIG. 2A; for example, the full wave rectifier bridge 310 of FIG. 3 corresponds to the full wave rectifier bridge 210 of FIG. 2A.

In the embodiment of FIG. 3, the auto-commutation function of the control circuit 320 is accomplished by each of the first, second, third, and fourth control transistors 322, 324, 326, and 328 having different respective first, second, third, and fourth threshold voltages $V_{TH1}$, $V_{TH2}$, $V_{TH3}$, and $V_{TH4}$.

The first threshold voltage $V_{TH1}$ is greater than the second threshold voltage $V_{TH2}$, the second threshold voltage $V_{TH2}$ is greater than the third threshold voltage $V_{TH3}$, and the third threshold voltage $V_{TH3}$ is greater than the fourth threshold voltage $V_{TH4}$ ($V_{TH1}>V_{TH2}>V_{TH3}>V_{TH4}$). As a result,
- all of the first to fourth control transistors 322 to 328 are turned on when the amplifier output $V_{OUT}$ is greater than the first threshold $V_{TH1}$ ($V_{OUT}>V_{TH1}$),
- the first control transistor 322 is turned off and the second to fourth control transistors 324 to 328 are turned on when the amplifier output $V_{OUT}$ is less than the first threshold $V_{TH1}$ and greater than the second threshold $V_{TH2}$ ($V_{TH1}>V_{OUT}>V_{TH2}$),
- the first and second control transistors 322 and 234 are turned off and the third and fourth control transistors 326 and 328 are turned on when the amplifier output $V_{OUT}$ is less than the second threshold $V_{TH2}$ and greater than the third threshold $V_{TH3}$ ($V_{TH2}>V_{OUT}>V_{TH3}$), and
- the first to third control transistors 324 to 328 are turned off and the fourth control transistor 328 is turned on when the amplifier output $V_{OUT}$ is less than the third threshold $V_{TH3}$ and greater than the third threshold $V_{TH4}$ ($V_{TH3}>V_{OUT}>V_{TH4}$).

As the input voltage $V_{IN}$ increases and the input current $I_{IN}$ flows through more of the first to fourth LEDs 302 to 308, the resulting increase in the input current $I_{IN}$ causes a voltage value of the current sense node CS to rise. The rise of the value the current sense node CS causes the value of amplifier output $V_{OUT}$ to decrease, which causes the first to third control transistors 324 to 328 to be successively be turned off, producing the auto-commutation and current regulation described with respect to FIGS. 2A-2D.

Figure 4:
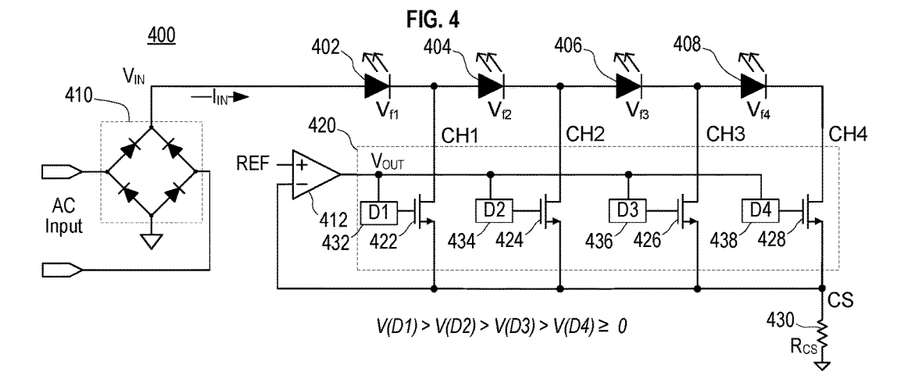
FIG. 4 illustrates a DACD LED circuit according to another embodiment.

FIG. 4 illustrates a DACD LED circuit 400 according to another embodiment. Elements of FIG. 4 correspond to respective like-numbered elements in FIG. 2A; for example, the full wave rectifier bridge 410 of FIG. 4 corresponds to the full wave rectifier bridge 210 of FIG. 2A.

In the embodiment of FIG. 4, the auto-commutation function of the control circuit 420 is accomplished by providing first, second, third, and fourth voltage drop circuits 432, 434, 436, and 438 between the amplifier output $V_{OUT}$ and control terminals of the first, second, third, and fourth control transistors 422, 424, 426, and 428, respectively. The first, second, and third voltage drop circuits 432, 434, 436, and 438 may each comprise one or more of a diode, a resistor, a voltage divider, and the like.

The first, second, third, and fourth voltage drop circuits 432, 434, 436, and 438 have first, second, third, and fourth voltage drops D1, D2, D3, and D4. The first voltage drop D1 is greater than the second voltage drop D2, the second voltage drop D2 is greater than the third voltage drop D3, and the third voltage drop D3 is greater than the fourth voltage drop D4. The fourth voltage drop D4 may be zero. For example, in an embodiment, the first, second, third, and fourth voltage drop circuits 432, 434, and 436 may have respective voltage drops corresponding to three, two, and one diodes connected in series, and the fourth voltage drop circuit 438 may be omitted (e.g., replaced with a wire), but embodiments are not limited thereto.

In an embodiment, respective threshold voltages of the first, second, third, and fourth control transistors 422, 424, 426, and 428 may have a same threshold voltage $V_{TH}$. As a result of the voltage drops, the effective threshold voltages of the first, second, third, and fourth control transistors 422, 424, 426, and 428, relative to the amplifier output $V_{OUT}$, may be $V_{TH}+D1$, $V_{TH}+D2$, $V_{TH}+D3$, and $V_{TH}+D4$, where $V_{TH}+D1>V_{TH}+D2>V_{TH}+D3>V_{TH}+D4$.

The DACD LED circuit 400 therefore operates in a manner similar to that described for the DACD LED circuit 300 of FIG. 3:
- all of the first to fourth control transistors 422 to 428 are turned on when the amplifier output $V_{OUT}$ is greater than the threshold voltage $V_{TH1}$ plus the first voltage drop D1 ($V_{OUT}>V_{TH}+D1$),
- the first control transistor 422 is turned off and the second to fourth control transistors 424 to 428 are turned on when the amplifier output $V_{OUT}$ is less than the threshold voltage $V_{TH1}$ plus the first voltage drop D1 and greater than the threshold voltage $V_{TH1}$ plus the second voltage drop D2 ($V_{TH}+D1>V_{OUT}>V_{TH}+D2$),
- the first and second control transistors 422 and 424 are turned off and the third and fourth control transistors 426 and 428 are turned on when the amplifier output $V_{OUT}$ is less than the threshold voltage $V_{TH1}$ plus the second voltage drop D2 and greater than the threshold voltage $V_{TH1}$ plus the third voltage drop D3 ($V_{TH}+D2>V_{OUT}>V_{TH}+D3$), and
- the first to third control transistors 424 to 428 are turned off and the fourth control transistor 428 is turned on when the amplifier output $V_{OUT}$ is less than the threshold voltage $V_{TH1}$ plus the third voltage drop D3 and greater than the threshold voltage $V_{TH1}$ plus the fourth voltage drop D4 ($V_{TH}+D3>V_{OUT}>V_{TH}+D4$).

As the input voltage $V_{IN}$ increases and the input current $I_{IN}$ flows through more of the first to fourth LEDs 402 to 408, the resulting increase in the input current $I_{IN}$ causes a voltage value of the current sense node CS to rise. The rise of the value the current sense node CS causes the value of amplifier output $V_{OUT}$ to decrease, which causes the first to third control transistors 424 to 428 to be successively be turned off, producing the auto-commutation and current regulation described with respect to FIGS. 2A-2D.

Figure 5:
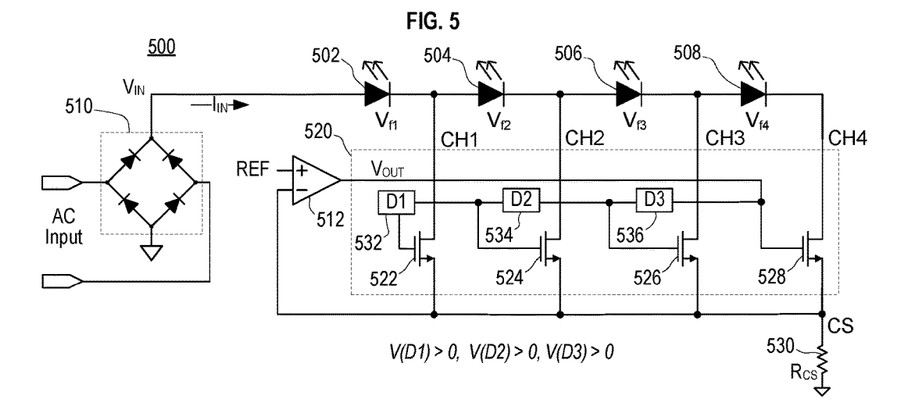
FIG. 5 illustrates a DACD LED circuit according to another embodiment.

FIG. 5 illustrates a DACD LED circuit 500 according to another embodiment. Elements of FIG. 5 correspond to respective like-numbered elements in FIG. 4; for example, the full wave rectifier bridge 510 of FIG. 5 corresponds to the full wave rectifier bridge 410 of FIG. 4.

In the embodiment of FIG. 5, the auto-commutation function of the control circuit 520 is accomplished by providing first, second, and third voltage drop circuits 532, 534, and 536, between the amplifier output $V_{OUT}$ and the first, second, third, and fourth control transistors 522, 524, 526, and 528, respectively. The first, second, and third voltage drop circuits 532, 534, and 536 may each comprise one or more of a diode, a resistor, a voltage divider, and the like.

The first, second, and third voltage drop circuits 532, 534, and 536 have first, second, and third voltage drops D1, D2, and D2, which may differ from each other or may be a same value. For example, in an embodiment, the first, second, and third voltage drop circuits 532, 534, and 536 may respectively comprise a diode, but embodiments are not limited thereto.

In an embodiment, respective threshold voltages of the first, second, third, and fourth control transistors 522, 524, 526, and 528 may have a same threshold voltage $V_{TH}$. As a result of the voltage drops, the effective threshold voltages of the first, second, third, and fourth control transistors 522, 524, 526, and 528, relative to the amplifier output $V_{OUT}$, may be $V_{TH}+D1+D2+D3$, $V_{TH}+D2+D3$, $V_{TH}+D3$, and $V_{TH}$.

The DACD LED circuit 500 therefore operates in a manner similar to that described for the DACD LED circuit 300 of FIG. 3:
- all of the first to fourth control transistors 522 to 528 are turned on when the amplifier output $V_{OUT}$ is greater than the threshold voltage $V_{TH1}$ plus the first to third voltage drops D1 to D3 ($V_{OUT}>V_{TH}+D1+D2+D3$),
- the first control transistor 522 is turned off and the second to fourth control transistors 524 to 528 are turned on when the amplifier output $V_{OUT}$ is less than the threshold voltage $V_{TH1}$ plus the first to third voltage drops D1 to D3 and greater than the threshold voltage $V_{TH1}$ plus the second and third voltage drops D2 and D3 ($V_{TH}+D1+D2+D3>V_{OUT}>V_{TH}+D2+D3$),
- the first and second control transistors 522 and 524 are turned off and the third and fourth control transistors 526 and 528 are turned on when the amplifier output $V_{OUT}$ is less than the threshold voltage $V_{TH1}$ plus the second and third voltage drops D2 and D3 and greater than the threshold voltage $V_{TH1}$ plus the third voltage drop D3 ($V_{TH}+D2+D3>V_{OUT}>V_{TH}+D3$), and
- the first to third control transistors 524 to 528 are turned off and the fourth control transistor 428 is turned on when the amplifier output $V_{OUT}$ is less than the threshold voltage $V_{TH1}$ plus the third voltage drop D3 and greater than the threshold voltage $V_{TH1}$ ($V_{TH}+D3>V_{OUT}>V_{TH}$).

As the input voltage $V_{IN}$ increases and the input current $I_{IN}$ flows through more of the first to fourth LEDs 502 to 508, the resulting increase in the input current $I_{IN}$ causes a voltage value of the current sense node CS to rise. The rise of the value the current sense node CS causes the value of amplifier output $V_{OUT}$ to decrease, which causes the first to third control transistors 524 to 528 to be successively be turned off, producing the auto-commutation and current regulation described with respect to FIGS. 2A-2D.

Figure 6:
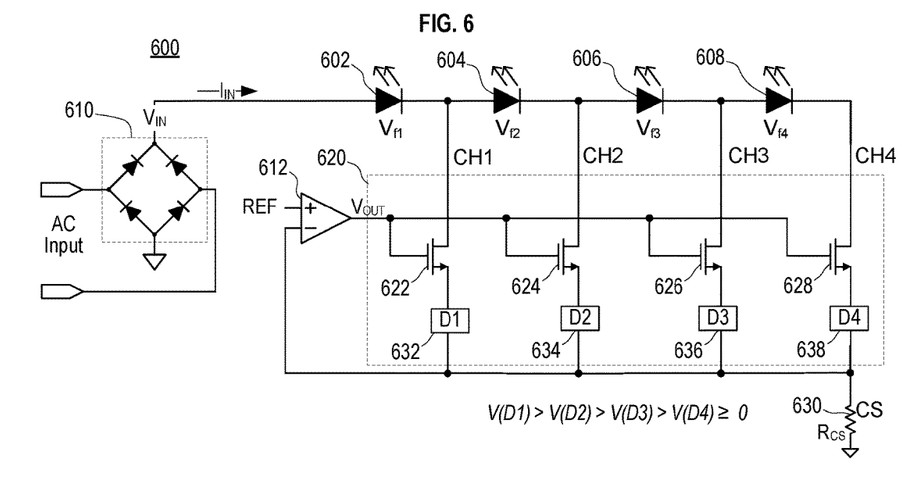
FIG. 6 illustrates a DACD LED circuit according to another embodiment.

FIG. 6 illustrates a DACD LED circuit 600 according to another embodiment. Elements of FIG. 6 correspond to respective like-numbered elements in FIG. 4; for example, the full wave rectifier bridge 610 of FIG. 6 corresponds to the full wave rectifier bridge 410 of FIG. 4.

The DACD LED circuit 600 differs from the DACD LED circuit 400 of FIG. 4 in that the first, second, third, and fourth voltage drop circuits 632, 634, 636, and 638 are respectively coupled between sources of the first, second, third, and fourth control transistors 622, 624, 626, and 628 and the current sense node CS, instead of being between gates of the control transistor and the amplifier output $V_{OUT}$ as shown in FIG. 4. The fourth voltage drop circuit 638 may be omitted (e.g., replaced with a wire) so that the fourth voltage drop D4 is zero.

In an embodiment in which respective threshold voltages of the first, second, third, and fourth control transistors 622, 624, 626, and 628 have a same threshold voltage $V_{TH}$, effective threshold voltages for the first, second, third, and fourth control transistors 622, 624, 626, and 628 are substantially the same as described for the respective control transistors of the DACD LED circuit 400 of FIG. 4. That is, the effective threshold voltages of the first, second, third, and fourth control transistors 622, 624, 626, and 628, relative to the amplifier output $V_{OUT}$, are $V_{TH}+D1$, $V_{TH}+D2$, $V_{TH}+D3$, and $V_{TH}+D4$, where $V_{TH}+D1>V_{TH}+D2>V_{TH}+D3>V_{TH}+D4$.

The DACD LED circuit 600 therefore operates substantially as described for the DACD LED circuit 400 of FIG. 4.

Figure 7:
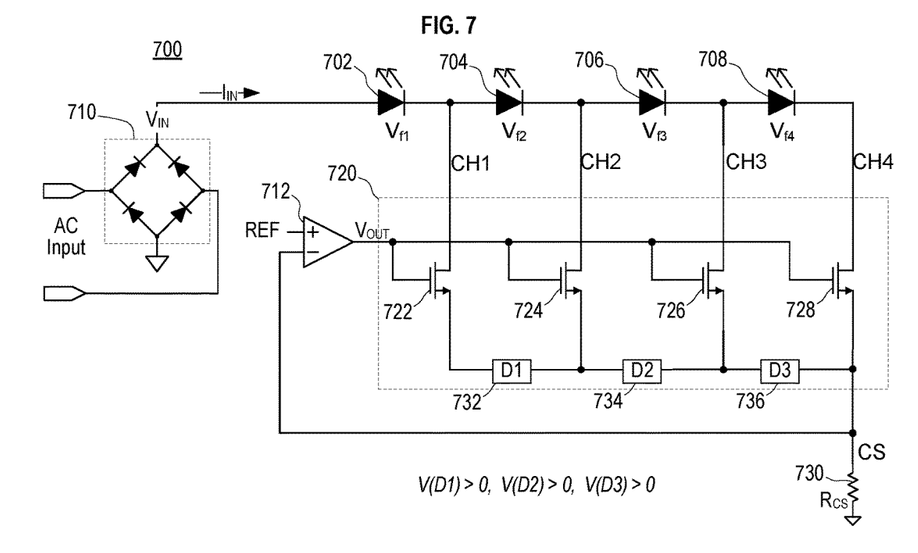
FIG. 7 illustrates a DACD LED circuit according to another embodiment.

FIG. 7 illustrates a DACD LED circuit 700 according to another embodiment. Elements of FIG. 7 correspond to respective like-numbered elements in FIG. 5; for example, the full wave rectifier bridge 710 of FIG. 7 corresponds to the full wave rectifier bridge 510 of FIG. 5.

The DACD LED circuit 700 differs from the DACD LED circuit 500 of FIG. 5 in that the first, second, and third voltage drop circuits 632, 634, and 636 are respectively coupled between sources of the first, second, third, and fourth control transistors 722, 724, 726, and 728, instead of being between gates of the control transistor as shown in FIG. 4.

In an embodiment in which respective threshold voltages of the first, second, third, and fourth control transistors 722, 724, 726, and 728 have a same threshold voltage $V_{TH}$, effective threshold voltages for the first, second, third, and fourth control transistors 622, 624, 626, and 628 are substantially the same as described for the respective control transistors of the DACD LED circuit 400 of FIG. 4. That is, the effective threshold voltages of the first, second, third, and fourth control transistors 722, 724, 726, and 728, relative to the amplifier output $V_{OUT}$, are respectively $V_{TH}+D1+D2+D3$, $V_{TH}+D2+D3$, $V_{TH}+D3$, and $V_{TH}$, where $V_{TH}+D1+D2+D3>V_{TH}+D2+D3>V_{TH}+D3>V_{TH}$.

The DACD LED circuit 600 therefore operates substantially as described for the DACD LED circuit 400 of FIG. 4.

Figure 8:
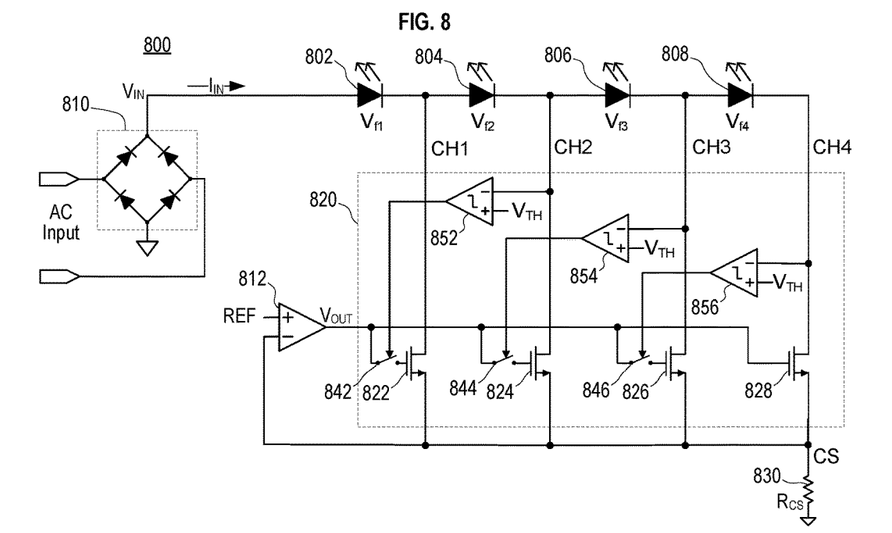
FIG. 8 illustrates a DACD LED circuit according to another embodiment.

FIG. 8 illustrates a DACD LED circuit 800 according to another embodiment. The DACD LED circuit 800 includes a full-wave rectifier bridge 810, first, second, third, and fourth LEDs 802, 804, 806, and 808, a differential amplifier 812, and an auto-commutated control circuit 820 (hereinafter, control circuit 820). The DACD LED circuit 800 further includes a Current Sense (CS) resistor 830 coupled between a current sense node CS and a circuit ground.

The control circuit 820 includes first, second, third, and fourth control transistors 822, 824, 826, and 828. Control terminals (e.g., gates) of the first, second, and third control transistors 822, 824, and 826 are coupled to an amplifier output $V_{OUT}$ of the differential amplifier 812 using first, second, and third switches 842, 844, and 846. First conduction terminals (e.g., source terminals) of the first, second, and third control transistors 822, 824, and 826 are coupled to the current sense node CS. Second conduction terminals (e.g., drain terminals) of the first, second, third, and fourth control transistors 822, 824, 826, and 828 are coupled to cathodes of the first, second, third, and fourth LEDs 802, 804, 806, and 808, respectively.

The first, second, and third switches 842, 844, and 846 are controlled by first, second, and third comparators 852, 854, and 856. The first, second, and third comparators 852, 854, and 856 compare voltages of the second conduction terminals of the second, third, and fourth control transistors 824, 826, and 828, respectively, to a threshold voltage $V_{TH}$. The $n^{th}$ comparator turns the $n^{th}$ switch on when the voltage at the second conduction terminal of the n+1$^{th}$ control transistor is below the threshold voltage $V_{TH}$. The $n^{th}$ comparator turns the $n^{th}$ switch off when the voltage at the second conduction terminal of the n+1$^{th}$ control transistor is above the threshold voltage $V_{TH}$.

Because the voltage at the second conduction terminal of the second, third, and fourth control transistors 824, 826, and 828 will be below the threshold voltage $V_{TH}$ when no current is flowing through the second, third, and fourth control transistors 824, 826, and 828, respectively, and will be above the threshold voltage $V_{TH}$ when a current flowing through the second, third, and fourth control transistors 824, 826, and 828 is greater than an amount corresponding to the threshold voltage $V_{TH}$ multiplied by a resistance of the CS resistor 830, the control circuit 820 operates to perform the auto-commutation operation illustrated in FIGS. 2A through 2D. As a result, the input current $I_{IN}$ is controlled by one of the first, second, third, and fourth control transistors 822, 824, 826, and 828 according to the amplifier output $V_{OUT}$ of the differential amplifier 812, and which of the first, second, third, and fourth control transistors 822, 824, 826, and 828 is used to control the input current $I_{IN}$ varies according to the input voltage $V_{IN}$.

Figure 9:
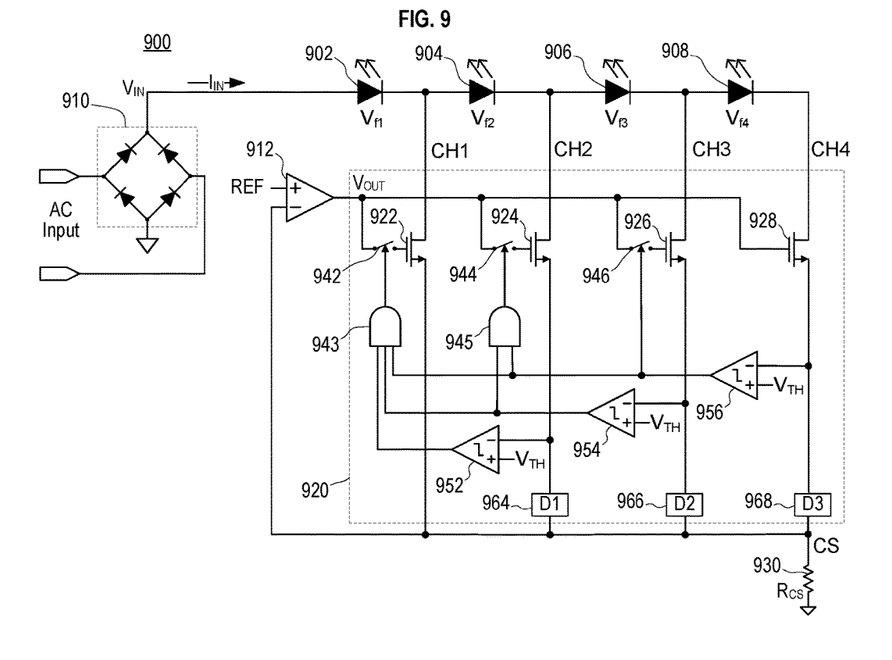
FIG. 9 illustrates a DACD LED circuit according to another embodiment.

FIG. 9 illustrates a DACD LED circuit 900 according to another embodiment. The DACD LED circuit 900 includes a full-wave rectifier bridge 910, first, second, third, and fourth LEDs 902, 904, 906, and 908 connected in series, a differential amplifier 912, and an auto-commutated control circuit 920 (hereinafter, control circuit 920). The DACD LED circuit 200 further includes a Current Sense (CS) resistor 930 coupled between a current sense node CS and a circuit ground.

The control circuit 920 includes first, second, third, and fourth control transistors 922, 924, 926, and 928, first, second, and third comparators 952, 954, and 956, and first and second AND gates 943 and 945. Control terminals (e.g., gates) of the first, second, and third control transistors 922, 924, and 926 are coupled to an amplifier output $V_{OUT}$ of the differential amplifier 912 using first, second, and third switches 942, 944, and 946. A first conduction terminal (e.g., a source terminal) of the first control transistors 922 is coupled to the current sense node CS. First conduction terminals of the second, third, and fourth control transistors 924, 926, and 928 are coupled to the current sense node CS through first, second, and third voltage drop circuits 964, 966, and 968. Second conduction terminals (e.g., drain terminals) of the first, second, third, and fourth control transistors 922, 924, 926, and 928 are coupled to cathodes of the first, second, third, and fourth LEDs 902, 904, 906, and 908, respectively.

In an embodiment, the first, second, and third voltage drop circuits 964, 966, and 968 respectively include one or more of a resistors, a diode, and the like.

The first, second, and third comparators 952, 954, and 956 compare voltages of the first conduction terminals of the second, third, and fourth control transistors 924, 926, and 928, respectively, to a threshold voltage $V_{TH}$. Outputs of the first, second, and third comparators 952, 954, and 956 are coupled to respective inputs of the first AND gate 943. The outputs of the second and third comparators 954 and 956 are also coupled to respective inputs of the second AND gate 945.

Accordingly, the first AND gate 943 controls the first switch 942 to be on when all of the voltages at the first conduction terminals of the second, third, and fourth control transistors 924, 926, and 928 are below the threshold voltage $V_{TH}$ and to be off when any of the voltages at the first conduction terminals of the second, third, and fourth control transistors 924, 926, and 928 are above the threshold voltage $V_{TH}$. The second AND gate 945 controls the second switch 944 to be on when both of the voltages at the first conduction terminals of the third and fourth control transistors 926 and 928 are below the threshold voltage $V_{TH}$ and to be off when either of the voltages at the first conduction terminals of the third and fourth control transistors 926 and 928 are above the threshold voltage $V_{TH}$. The third comparator 956 controls the third switch 946 to be on when the voltage at the first conduction terminal of the fourth control transistor 928 is below the threshold voltage $V_{TH}$ and to be off when the voltage at the first conduction terminal of the fourth control transistor 928 is above the threshold voltage $V_{TH}$.

The voltage at the first conduction terminal of the second, third, and fourth control transistors 924, 926, and 928 is equal to a sum of a voltage drop across the CS resistor 930 and a voltage drop across the first, second, and third voltage drop circuits 964, 966, and 968, respectively. The voltage drop across the first, second, and third voltage drop circuits 964, 966, and 968 is caused by respective currents through the second, third, and fourth control transistors 924, 926, and 928, respectively. As a result, voltages at the first conduction terminal of the second, third, and fourth control transistors 924, 926, and 928 respectively increase as currents through the second, third, and fourth control transistors 924, 926, and 928 respectively increase.

Accordingly the voltages at the first conduction terminals of the second, third, and fourth control transistors 924, 926, and 928 being above the threshold voltage $V_{TH}$ indicates that currents are flowing through the second, third, and fourth control transistors 924, 926, and 928, respectively. As a result, the first control transistor 922 is turned off when a current through any of the second, third, or fourth control transistors 924, 926, or 928 is sufficiently large, the second control transistor 924 is turned off when a current through the third or fourth control transistors 926 or 928 is sufficiently large, and the third control transistor 926 is turned off when a current through the fourth control transistor 928 is sufficiently large.

As a result, the input current $I_{IN}$ is controlled by one of the first, second, third, and fourth control transistors 922, 924, 926, and 928 according to the amplifier output $V_{OUT}$ of the differential amplifier 912. Which of the first, second, third, and fourth control transistors 922, 924, 926, and 928 is used to control the input current $I_{IN}$ varies according to the input voltage $V_{IN}$.

Figure 10:
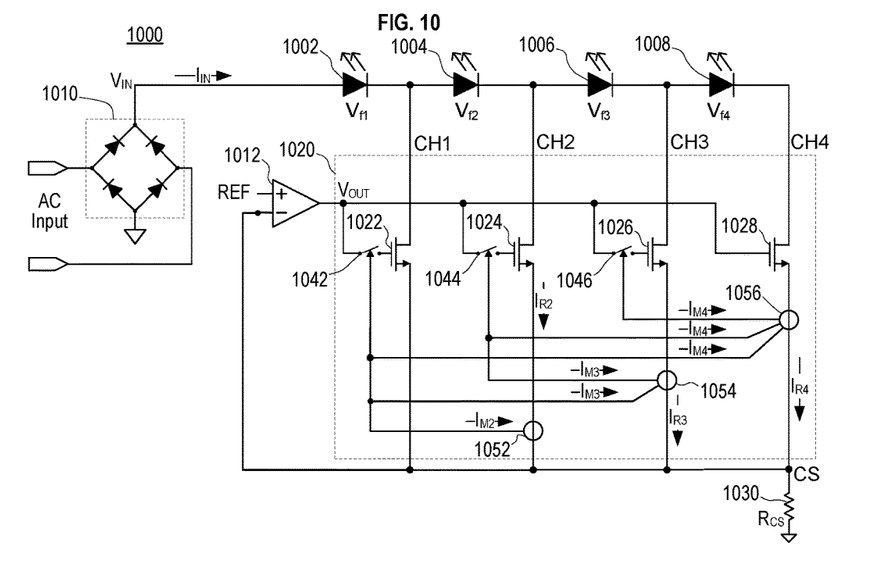
FIG. 10 illustrates a DACD LED circuit according to another embodiment.

FIG. 10 illustrates a DACD LED 100 circuit according to another embodiment. The DACD LED circuit 1000 includes a full-wave rectifier bridge 1010, first, second, third, and fourth LEDs 1002, 1004, 1006, and 1008 connected in series, a differential amplifier 1012, and an auto-commutated control circuit 1020 (hereinafter, control circuit 1020). The DACD LED circuit 200 further includes a Current Sense (CS) resistor 1030 coupled between a current sense node CS and a circuit ground.

The differential amplifier 1012 receives a reference voltage REF at a positive input and a voltage of the current sense node CS at a negative input, and produces an amplifier output $V_{OUT}$ corresponding to a difference between the two received values.

The control circuit 1020 includes first, second, third, and fourth control transistors 1022, 1024, 1026, and 1028. Control terminals (e.g., gates) of the first, second, and third control transistors 1022, 1024, and 1026 are coupled to an amplifier output $V_{OUT}$ of the differential amplifier 1012 using first, second, and third switches 1042, 1044, and 1046. A first conduction terminal (e.g., a source terminal) of the first control transistors 1022 is coupled to the current sense node CS. First conduction terminals of the second, third, and fourth control transistors 1024, 1026, and 1028 are coupled to the current sense node CS through first, second, and third current mirror circuits 1052, 1054, and 1056. Second conduction terminals (e.g., drain terminals) of the first, second, third, and fourth control transistors 1022, 1024, 1026, and 1028 are coupled to cathodes of the first, second, third, and fourth LEDs 1002, 1004, 1006, and 1008, respectively.

The first, second, and third current mirror circuits 1052, 1054, and 1056 control first, second, and third mirrored currents $I_{M2}$, $I_{M3}$, and $I_{M4}$ having magnitudes corresponding to first, second, and third conduction currents $I_{R2}$, $I_{R3}$, and $I_{R4}$ through the second, third, and fourth control transistors 1024, 1026, and 1028. In an embodiment, the second current mirror circuit 1054 is a multiple-output current mirror circuit having first and second outputs each controlling a mirror current $I_{M3}$, and the third current mirror circuit 1056 is a multiple-output current mirror circuit having first, second, and third outputs each controlling a mirror current $I_{M4}$.

In an embodiment, the first, second, and third current mirror circuits 1052, 1054, and 1056 respectively include a first transistor and one or more second transistors, such as n-channel MOSFETs, having respective sources connected to the current sense node CS and respective gates coupled to each other and to the first conduction terminals of the corresponding one of the second, third, and fourth control transistors 1022, 1024, 1026, and 1028. Drains of the first transistors of the first, second, and third current mirror circuits 1052, 1054, and 1056 are respectively coupled to the first conduction terminals of the second, third, and fourth control transistors 1022, 1024, 1026, and 1028. Drains of each of the one or more second transistors of the first, second, and third current mirror circuits 1052, 1054, and 1056 are respectively coupled to outputs of the respective first, second, and third current mirror circuits 1052, 1054, and 1056.

First outputs of the first, second, and third current mirrors 1052, 1054, and 1056 are coupled to the control terminal of the first switch 1042. Second outputs of the second and third current mirrors 1054 and 1056 are coupled to the control terminal of the second switch 1044. A third output of the third current mirror 1056 is coupled to the control terminal of the third switch 1045.

The first, second, and third switches 1042, 1044, and 1046 are controlled by the first, second, and third mirrored current $I_{M2}$, $I_{M3}$, and $I_{M4}$. When all of the first, second, and third mirrored currents $I_{M2}$, $I_{M3}$, and $I_{M4}$ are below a threshold value, the first, second, and third switches 1042, 1044, and 1046 are on. When any of the first, second, and third mirrored currents $I_{M2}$, $I_{M3}$, and $I_{M4}$ are above the threshold value, the first switch 1042 is off. When either of the second and third mirrored currents $I_{M3}$ and $I_{M4}$ are above the threshold value, the second switch 1044 is off. When the third mirrored currents $I_{M4}$ is above the threshold value, the third switch 1046 is off. Accordingly, the $n^{th}$ switch is turned off when a current through any of the conduction terminals of the $n+1^{th}$ through $N^{th}$ control transistor is above the threshold value, for N equal to a number of control transistors and n in the range 1 to N−1.

Figure 11:
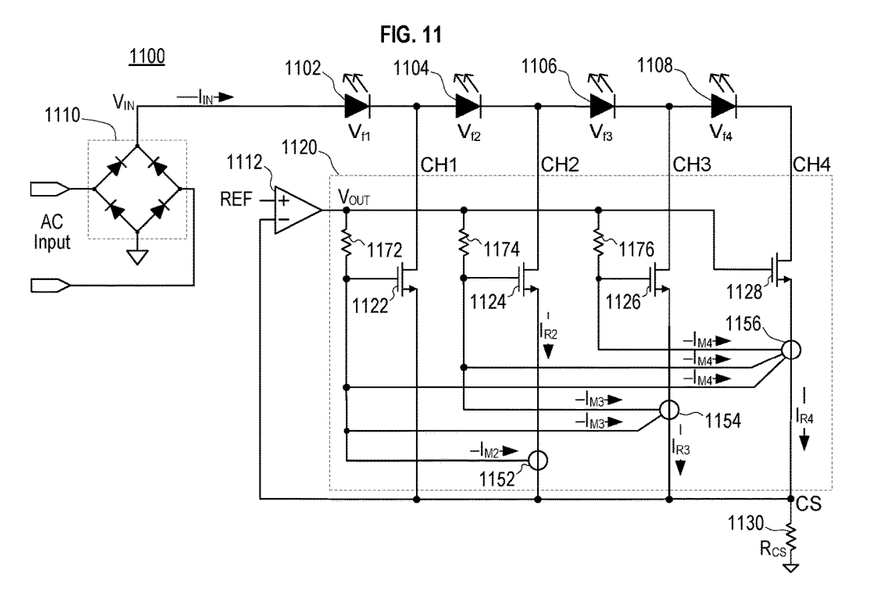
FIG. 11 illustrates a DACD LED circuit according to another embodiment.

FIG. 11 illustrates a DACD LED circuit 1100 according to another embodiment. Elements of FIG. 11 correspond to respective like-numbered elements in FIG. 10; for example, the full wave rectifier bridge 1110 of FIG. 11 corresponds to the full wave rectifier bridge 1010 of FIG. 10. The control circuit 1120 of FIG. 11 differs from the control circuit 1020 of FIG. 10 in that the control terminals (e.g., gates) of the first, second, and third control transistors 1122, 1124, and 1126 are coupled to an amplifier output $V_{OUT}$ of the differential amplifier 1112 using first, second, and third resistors 1172, 1174, and 1176, instead of using switches as shown in FIG. 10. As in FIG. 10, the second and third current mirror circuits 1154 and 1156 are multi-output current mirror circuits that respectively produce multiple instances of the second and third mirrored currents $I_{M3}$ and $I_{M4}$.

First, second, and third mirrored currents $I_{M2}$, $I_{M3}$, and $I_{M4}$ are coupled to control terminals of the first, second, and third control transistors 1122, 1124, and 1126. In particular, the control terminal of the first control transistor 1122 is coupled to instances of the first, second, and third mirror currents $I_{M2}$, $I_{M3}$, and $I_{M4}$, the control terminal of the second control transistor 1124 is coupled to instances of the second and third mirror currents $I_{M3}$ and $I_{M4}$, and the control terminal of the third control transistor 1126 is coupled to an instance of the third mirror currents $I_{M4}$.

Accordingly, voltage drops corresponding to resistances of the first, second, and third resistors 1172, 1174, and 1176 and to the first, second, and third mirrored currents $I_{M2}$, $I_{M3}$, and $I_{M4}$ are respectively generated between the amplifier output $V_{OUT}$ of the differential amplifier 1112 and the control terminals of the first, second, and third control transistors 1122, 1124, and 1126.

As a result, when any of the first, second, and third mirrored current $I_{M2}$, $I_{M3}$, and $I_{M4}$ is sufficiently large, a voltage at the control terminal of the first control transistor 1122 drops sufficiently that the first control transistor 1122 turns off. Similarly, when either of the second and third mirrored current $I_{M3}$ and $I_{M5}$ is sufficiently large, the second control transistor 1124 turns off, and when the third mirrored current $I_{M4}$ is sufficiently large, the third control transistor 1126 turns off.

Figure 12A:
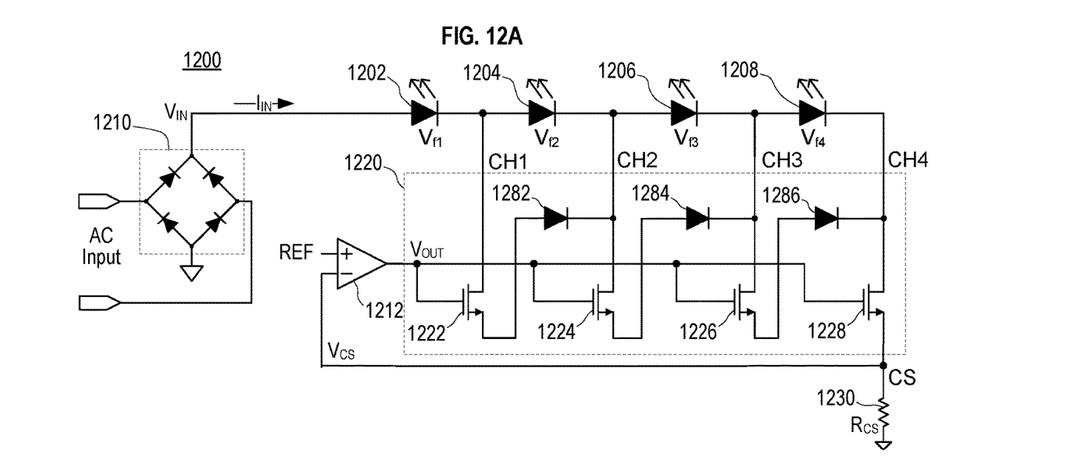
FIG. 12A illustrates a DACD LED circuit according to another embodiment.

FIG. 12A illustrates a DACD LED circuit 1200 according to another embodiment. The DACD LED circuit 1000 includes a full-wave rectifier bridge 1210, first, second, third, and fourth LEDs 1202, 1204, 1206, and 1208 connected in series, a differential amplifier 1212, and an auto-commutated control circuit 1220 (hereinafter, control circuit 1220). The DACD LED circuit 200 further includes a Current Sense (CS) resistor 1230 coupled between a current sense node CS and a circuit ground.

The differential amplifier 1212 receives a reference voltage REF at a positive input and a voltage of the current sense node CS at a negative input, and produces an amplifier output $V_{OUT}$ corresponding to a difference between the two received values. Accordingly, a value of the amplifier output $V_{OUT}$ is high when the input current $I_{IN}$ is less than a target current corresponding to the reference voltage REF times a resistance of the CS resistor 1230, and is lower when the input current $I_{IN}$ is greater than the target current.

In embodiments, a reference voltage REF may be a predetermined DC voltage, a programmable DC voltage, or an AC voltage having a sinusoidal waveform. The AC waveform may be derived from the input voltage $V_{IN}$ or may be generated by a circuit (not shown) internal to the DACD LED circuit 1200.

The control circuit 1220 includes first, second, third, and fourth control transistors 1222, 1224, 1226, and 1228. Control terminals (e.g., gates) of the first, second, and third control transistors 1222, 1224, and 1226 are coupled to the amplifier output $V_{OUT}$ of the differential amplifier 1212.

A first conduction terminal (e.g., a source terminal) of the first control transistor 1222 is coupled to a second conduction terminal (e.g. a drain terminal) of the second control transistor 1224 through a first blocking diode 1282. A first conduction terminal of the second control transistor 1224 is coupled to a second conduction terminal of the third control transistor 1226 through a second blocking diode 1284. A first conduction terminal of the third control transistor 1226 is coupled to a second conduction terminal of the fourth control transistor 1228 through a third blocking diode 1286. A first conduction terminal of the third control transistor 1226 is coupled to the current sense node CS. The second conduction terminals of the first, second, third, and fourth control transistors 1222, 1224, 1226, and 1228 are also coupled to cathodes of the first, second, third, and fourth LEDs 1202, 1204, 1206, and 1208, respectively.

In an embodiment, the first, second, and third blocking diodes 1282, 1284, and 1286 have forward voltage drops of 0.7 V.

The fourth control transistor 1228 is turned on when a fourth gate-to-source voltage $V_{GS4}$ of the fourth control transistor 1228 is higher than a fourth threshold voltage $V_{TH4}$ of the fourth control transistor 1228. The fourth control transistor 1228 controls a magnitude of the input current when operating in an ohmic mode, that is, when a fourth drain-to-source voltage $V_{DS4}$ is less than the fourth gate-to-source voltage $V_{GS4}$ minus the fourth threshold voltage $V_{TH4}$. The fourth control transistor 1228 is turned on but does not control a magnitude of the input current when operating in a saturation region, that is, when a fourth drain-to-source voltage $V_{DS4}$ is greater than the fourth gate-to-source voltage $V_{GS4}$ minus the fourth threshold voltage $V_{TH4}$. The fourth gate-to-source voltage $V_{GS4}$ is equal to the difference between the amplifier output $V_{OUT}$ and a CS voltage $V_{CS}$ of the CS node CS.

The third control transistor 1226 is turned on when a third gate-to-source voltage $V_{GS3}$ of the third control transistor 1226 is higher than a third threshold voltage $V_{TH3}$ of the third control transistor 1226. The third control transistor 1226 controls the magnitude of the input current when operating in an ohmic mode, that is, when a third drain-to-source voltage $V_{DS3}$ is less than the third gate-to-source voltage $V_{GS3}$ minus the third threshold voltage $V_{TH3}$. The third control transistor 1226 is turned on but does not control a magnitude of the input current when operating in a saturation region, that is, when the third drain-to-source voltage $V_{DS3}$ is greater than the third gate-to-source voltage $V_{GS3}$ minus the third threshold voltage $V_{TH3}$. The third gate-to-source voltage $V_{GS3}$ is equal to the difference between the amplifier output $V_{OUT}$ and a sum of the forward voltage drop across the third blocking diode 1286, the fourth drain-to-source voltage $V_{DS4}$, and the CS voltage $V_{CS}$ of the of the CS node CS.

The second control transistor 1224 is turned on when a second gate-to-source voltage $V_{GS2}$ of the second control transistor 1224 is higher than a second threshold voltage $V_{TH2}$ of the second control transistor 1224. The second control transistor 1224 controls the magnitude of the input current when operating in an ohmic mode, that is, when a second drain-to-source voltage $V_{DS2}$ is less than the second gate-to-source voltage $V_{GS2}$ minus the second threshold voltage $V_{TH2}$. The second control transistor 1224 is turned on but does not control the magnitude of the input current when operating in a saturation region, that is, when a second drain-to-source voltage $V_{DS2}$ is greater than the second gate-to-source voltage $V_{GS2}$ minus the second threshold voltage $V_{TH2}$. The second gate-to-source voltage $V_{GS2}$ is equal to the difference between the amplifier output $V_{OUT}$ and a sum of the forward voltage drop across the second and third blocking diodes 1284 and 1286, the third and fourth drain-to-source voltages $V_{DS3}$ and $V_{DS4}$, and the CS voltage $V_{CS}$ of the of the CS node CS.

The first control transistor 1222 is turned on when a first gate-to-source voltage $V_{GS2}$ of the first control transistor 1222 is higher than a first threshold voltage $V_{TH2}$ of the first control transistor 1222. The first control transistor 1222 controls the magnitude of the input current when operating in an ohmic mode, that is, when a first drain-to-source voltage $V_{DS2}$ is less than the first gate-to-source voltage $V_{GS2}$ minus the first threshold voltage $V_{TH2}$. The first control transistor 1222 is turned on but does not control the magnitude of the input current when operating in a saturation region, that is, when the first drain-to-source voltage $V_{DS2}$ is greater than the first gate-to-source voltage $V_{GS2}$ minus the first threshold voltage $V_{TH2}$. The second gate-to-source voltage $V_{GS2}$ is equal to the difference between the amplifier output $V_{OUT}$ and a sum of the forward voltage drop across the first, second, and third blocking diodes 1282, 1284, and 1286, the second, third, and fourth drain-to-source voltages $V_{DS2}$, $V_{DS3}$, and $V_{DS4}$, and the CS voltage $V_{CS}$ of the of the CS node CS.

Operation of the DACD LED circuit 1200 will be explained with reference to FIG. 12B.

Figure 12B:
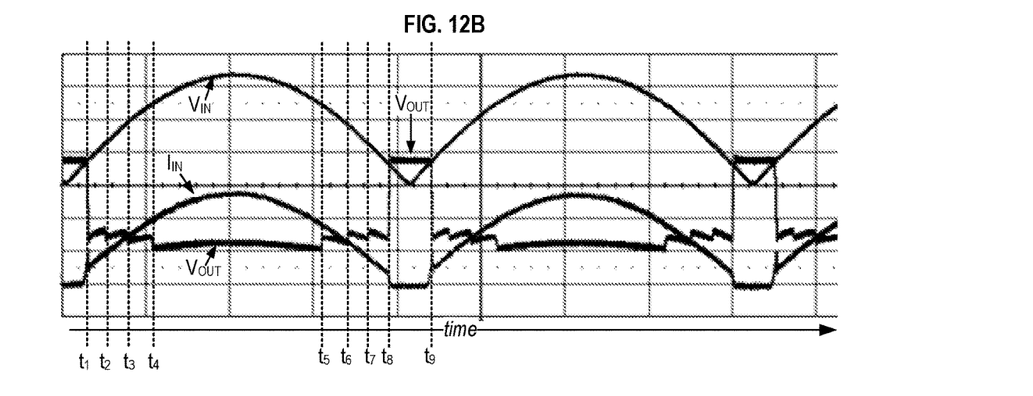
FIG. 12B is a graph of voltages and currents during an operation of the DACD LED circuit of FIG. 12B.

FIG. 12B is a graph of voltages and currents during an operation of the DACD LED circuit 1200 of FIG. 12B. Voltages shown are an input voltage $V_{IN}$ and the amplifier output $V_{OUT}$ produced by the differential amplifier 1212. A current shown is the input current $I_{IN}$. In the example shown in FIG. 12B, the reference voltage REF may be a sinusoidal waveform derived from the input voltage $V_{IN}$.

In a period before a first time $t_1$, the input voltage $V_{IN}$ is too low to forward bias any of the first to fourth LEDs 1202 to 1208, and as a result the input current $I_{IN}$ is substantially zero and the CS voltage $V_{CS}$ is substantially zero. The amplifier output $V_{OUT}$ therefore has a voltage value substantially higher than the combined forward voltage drop across the first, second, and third blocking diodes 1282, 1284, and 1286, the second, third, and fourth drain-to-source voltages $V_{DS2}$, $V_{DS3}$, and $V_{DS4}$, and the CS voltage $V_{CS}$ of the of the CS node CS. Accordingly, all of the first to fourth control transistors 1222 to 1228 are turned on.

At the first time $t_1$, the input voltage $V_{IN}$ reaches a value sufficient to forward bias the first LED 1202. As a result, the input current $I_{IN}$ flows through the first LED 1202, the first to fourth control transistors 1222 to 1228, the first to third blocking diodes 1282 to 1286, and the CS resistor 1230.

In the period between the first time $t_1$ and a second time $t_2$, the input voltage $V_{IN}$ rises, causing an increase in the input current $I_{IN}$ and a corresponding increase in the CS voltage $V_{CS}$. During this period, the first control transistor 1222 operates in the ohmic mode to control the magnitude of the input current $I_{IN}$.

At the second time $t_2$, the input voltage $V_{IN}$ reaches a value sufficient to forward bias both the first and second LEDs 1202 and 1204. As a result, the input current $I_{IN}$ flows through the first and second LEDs 1202 and 1204, causing voltage to be generated at the drain of the second control transistor 1224 that back-biases the first blocking diode 1282 and turns off the first control transistor 1222. The input current $I_{IN}$ therefore flows through the first and second LEDs 1202 and 1204, the second to fourth control transistors 1224 to 1228, the second and third blocking diodes 1284 to 1286, and the CS resistor 1230.

In the period between the second time $t_2$ and a third time $t_3$, the input voltage $V_{IN}$ rises, causing an increase in the input current $I_{IN}$ and a corresponding increase in the CS voltage $V_{CS}$. During this period, the first control transistor 1222 is off and the second control transistor 1224 operates in the ohmic mode to control the magnitude of the input current $I_{IN}$.

At the third time $t_3$, the input voltage $V_{IN}$ reaches a value sufficient to forward bias all of the first to third LEDs 1202 to 1206. As a result, the input current $I_{IN}$ flows through the first to third LEDs 1202 to 1206, causing voltage to be generated at the drain of the third control transistor 1226 that back-biases the first and second blocking diodes 1282 and 1284 and turns off the first and second control transistors 1222 and 1224. The input current $I_{IN}$ therefore flows through the first to third second LEDs 1202 to 1206, the third and fourth control transistors 1226 and 1228, the third blocking diode 1286, and the CS resistor 1230.

In the period between the third time $t_3$ and a fourth time $t_4$, the input voltage $V_{IN}$ rises, causing an increase in the input current $I_{IN}$ and a corresponding increase in the CS voltage $V_{CS}$. During this period, the first and second control transistors 1222 and 1224 are off and the third control transistor 1226 operates in the ohmic mode to control the magnitude of the input current $I_{IN}$.

In the period between the second time $t_2$ and a third time $t_3$, the input voltage $V_{IN}$ rises, causing an increase in the input current $I_{IN}$ and a corresponding increase in the CS voltage $V_{CS}$. During this period, the first control transistor 1222 is off and the second control transistor 1224 operates in the ohmic mode to control the magnitude of the input current $I_{IN}$.

At the fourth time $t_4$, the input voltage $V_{IN}$ reaches a value sufficient to forward bias all of the first to fourth LEDs 1202 to 1208. As a result, the input current $I_{IN}$ flows through the first to fourth LEDs 1202 to 1208, causing voltage to be generated at the drain of the fourth control transistor 1228 that back-biases the first to third blocking diodes 1282 to 1286 and turns off the first to third control transistors 1222 and 1226. The input current $I_{IN}$ therefore flows through the first to fourth second LEDs 1202 to 1208, the fourth control transistor 1228, and the CS resistor 1230.

In the period between the fourth time $t_4$ and a fifth time $t_5$, the input voltage $V_{IN}$ rises and then falls, causing an increase and then a decrease in the input current $I_{1N}$ and a corresponding increase and decreases in the CS voltage $V_{CS}$. During this period, the first to third control transistors 1222 to 1226 are off and the fourth control transistor 1228 operates in the ohmic mode to control the magnitude of the input current $I_{IN}$.

At the fifth time $t_5$, the input voltage $V_{IN}$ decreases to a value insufficient to forward bias all of the first to fourth LEDs 1202 to 1208 but sufficient to forward bias all of the first to third LEDs 1202 to 1206. As a result, the input current $I_{IN}$ flows through the first to third LEDs 1202 to 1206, causing voltage to be generated at the drain of the third control transistor 1226 that back-biases the first and second blocking diodes 1282 and 1284 and turns off the first and second control transistors 1222 and 1224. The input current $I_{IN}$ therefore flows through the first to third second LEDs 1202 to 1206, the third and fourth control transistors 1226 and 1228, the third blocking diode 1286, and the CS resistor 1230.

In the period between the fifth time $t_5$ and a sixth time $t_6$, the input voltage $V_{IN}$ decreases, causing a decrease in the input current $I_{IN}$ and a corresponding decrease in the CS voltage $V_{CS}$. During this period, the first and second control transistors 1222 and 1224 are off and the third control transistor 1226 operates in the ohmic mode to control the magnitude of the input current $I_{IN}$.

At the sixth time $t_6$, the input voltage $V_{IN}$ decreases to a value insufficient to forward bias all of the first to third LEDs 1202 to 1206 but sufficient to forward bias both the first and second LEDs 1202 and 1204. As a result, the input current $I_{IN}$ flows through the first and second LEDs 1202 and 1204, causing voltage to be generated at the drain of the second control transistor 1224 that back-biases the first blocking diode 1282 and turns off the first control transistor 1222. The input current $I_{IN}$ therefore flows through the first and second LEDs 1202 and 1204, the second to fourth control transistors 1224 to 1228, the second and third blocking diodes 1284 to 1286, and the CS resistor 1230.

In the period between the sixth time $t_6$ and a seventh time $t_7$, the input voltage $V_{IN}$ decreases, causing a decrease in the input current $I_{IN}$ and a corresponding decreases in the CS voltage $V_{CS}$. During this period, the first control transistor 1222 is off and the second control transistor 1224 operates in the ohmic mode to control the magnitude of the input current $I_{IN}$.

At the seventh time $t_7$, the input voltage $V_{IN}$ input voltage $V_{IN}$ decreases to a value insufficient to forward bias both of the first and second LEDs 1202 and 1204 but sufficient to forward bias the first LED 1202. As a result, the input current $I_{IN}$ flows through the first LED 1202, the first to fourth control transistors 1222 to 1228, the first to third blocking diodes 1282 to 1286, and the CS resistor 1230.

In the period between the seventh time $t_7$ and an eight time $t_8$, the input voltage $V_{IN}$ decreases, causing a decrease in the input current $I_{IN}$ and a corresponding decreases in the CS voltage $V_{CS}$. During this period, the first control transistor 1222 operates in the ohmic mode to control the magnitude of the input current $I_{IN}$.

In a period after the eighth time t8 and before a ninth time $t_9$, the input voltage $V_{IN}$ is too low to forward bias any of the first to fourth LEDs 1202 to 1208, and as a result the input current $I_{IN}$ is substantially zero and the CS voltage $V_{CS}$ is substantially zero. The amplifier output $V_{OUT}$ therefore has a voltage value substantially higher than the combined forward voltage drop across the first, second, and third blocking diodes 1282, 1284, and 1286, the second, third, and fourth drain-to-source voltages $V_{DS2}$, $V_{DS3}$, and $V_{DS4}$, and the CS voltage $V_{CS}$ of the of the CS node CS. Accordingly, all of the first to fourth control transistors 1222 to 1228 are turned on.

At the ninth time $t_9$, the operations described beginning at the first time $t_1$ are repeated.

Figure 13:
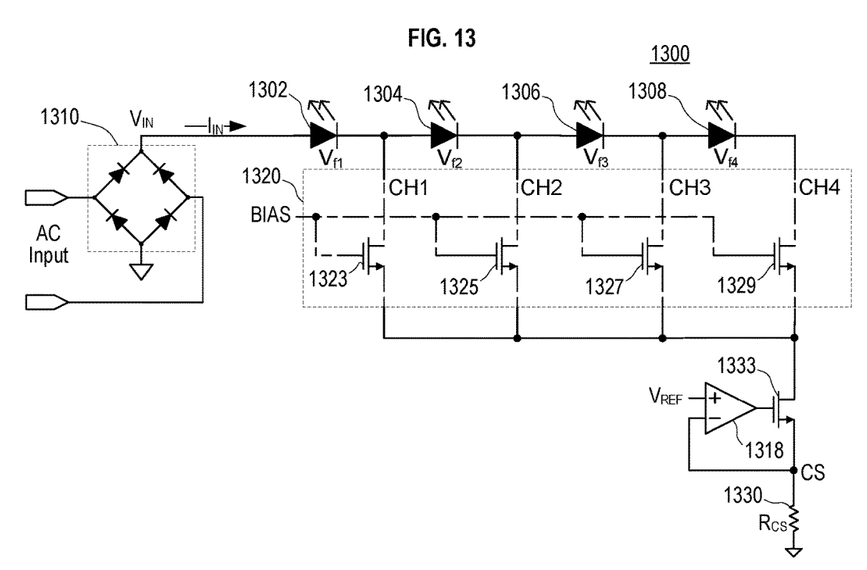
FIG. 13 illustrates a DACD LED circuit according to another embodiment.

FIG. 13 illustrates a DACD LED circuit 1320 according to another embodiment. The DACD LED circuit 200 includes a full-wave rectifier bridge 1310, first, second, third, and fourth LEDs 1302, 1304, 1306, and 1308, a differential amplifier 1312, a regulating transistor 1333, and an auto-commutated control circuit 1320 (hereinafter, control circuit 1320). The DACD LED circuit 200 further includes a Current Sense (CS) resistor 1330 coupled between a current sense node CS and a circuit ground.

The first, second, third, and fourth LEDs 202, 204, 206, and 208 are coupled in series, with the cathode of the first LED 202 coupled to the anode of the second LED 204, the cathode of the second LED 204 coupled to the anode of the third LED 203, and the cathode of the third LED 206 coupled to the anode of the fourth LED 208. The anode of the first LED 202 is connected to a positive output terminal (an input voltage $V_{IN}$) of the full-wave rectifier bridge 210. A negative output terminal of the full-wave rectifier bridge 210 is coupled to the circuit ground.

The control circuit 1320 includes first, second, third, and fourth cascode transistors 1323, 1325, 1327, and 1329. Control terminals (e.g., gates) of the first, second, third, and fourth cascode transistors 1323, 1325, 1327, and 1329 are coupled to one or more bias voltages by circuits within the control circuit 1320. First conduction terminals (e.g., drains) of the first, second, third, and fourth cascode transistors 1323, 1325, 1327, and 1329 are respectively coupled to cathodes of the first, second, third, and fourth LEDs 1302, 1304, 1306, and 1308 by the circuits within the control circuit 1320. Second conduction terminals (e.g., sources) of the first, second, third, and fourth cascode transistors 1323, 1325, 1327, and 1329 are each coupled to a first conduction terminal (e.g., a drain) of the regulating transistor 1333 by the circuits within the control circuit 1320.

A negative input of the differential amplifier is 1312 coupled to the current sense node CS. A positive input of the differential amplifier 1312 is coupled to a reference voltage REF. An output of the differential amplifier is 1312 is coupled to a control terminal (e.g., a gate) of the regulating transistor 1333. A voltage value of the amplifier output $V_{OUT}$ corresponds to the amount by which a voltage value of the current sense node CS is less than a voltage value of the reference voltage REF.

A second conduction terminal (e.g., a source) of the regulating transistor 1333 is coupled to the CS node CS. The differential amplifier 1312 controls the regulating transistor 1333 to regulate a magnitude of the input current $I_{IN}$ of the DACD LED circuit 1320.

In an embodiment, the reference voltage REF is a Direct Current (DC) voltage.

In another embodiment, the reference voltage REF is an AC voltage derived from the input voltage $V_{IN}$.

The circuits within the control circuit 1320 (not shown in FIG. 13) select which of the first, second, third, and fourth cascode transistors 1323, 1325, 1327, and 1329 conducts the input current $I_{IN}$, according to the input voltage $V_{IN}$. Because the first, second, third, and fourth cascode transistors 1323, 1325, 1327, and 1329 are cascode transistors of a cascode stage of a cascode amplifier, of which the regulating transistor 1333 is an input stage, the transistor of the first, second, third, and fourth cascode transistors 1323, 1325, 1327, and 1329 that is selected to conduct the input current $I_{IN}$ also participates in the regulation of the magnitude of the input current $I_{IN}$.

Figure 14:
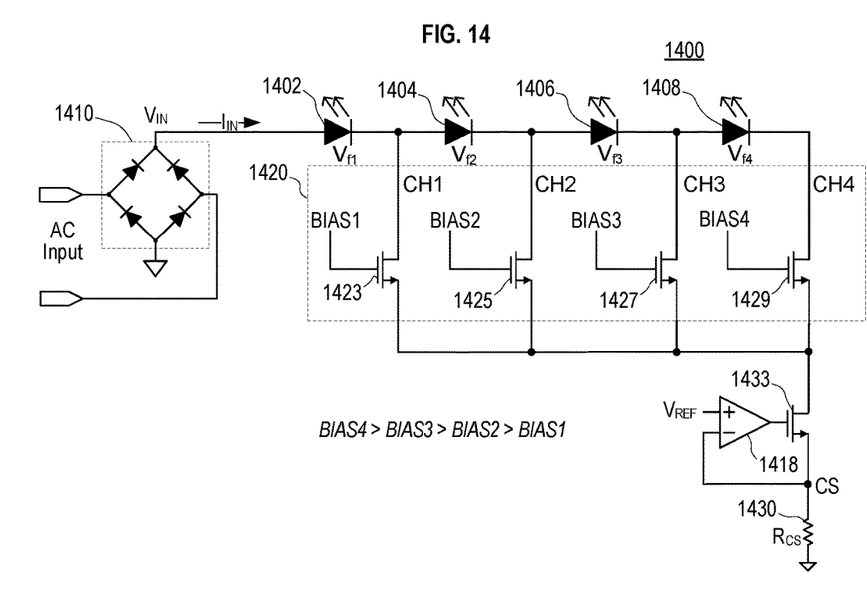
FIG. 14 illustrates a DACD LED circuit according to another embodiment.

FIG. 14 illustrates a DACD LED circuit 1400 according to another embodiment. Elements of FIG. 14 correspond to respective like-numbered elements in FIG. 13; for example, the full wave rectifier bridge 1410 of FIG. 14 corresponds to the full wave rectifier bridge 1310 of FIG. 13, the first to fourth cascode transistors 1423 to 1429 of FIG. 14 correspond to the first to fourth cascode transistors 1323 to 1329 of FIG. 13, and so on.

In the DACD LED circuit 1400, the control circuit 1420 provides first, second, third, and fourth bias voltages BIAS1, BIAS2, BIAS3, and BIAS4 to the first, second, third, and fourth cascode transistors 1423, 1425, 1427, and 1429, respectively. The first bias voltage BIAS1 is less than the second bias voltage BIAS2, second bias voltage BIAS2 is less than the third bias voltage BIAS3, and the third bias voltage BIAS3 is less than the fourth bias voltage BIAS4.

As a result, the input current $I_{IN}$ is conducted in a manner similar to that described with respect to FIGS. 2A to 2D, wherein the input current $I_{IN}$ is conducted and controlled by the first cascode transistor 1423 when the input voltage $V_{IN}$ is sufficient to forward bias only the first LED 1402, by the second cascode transistor 1425 when the input voltage $V_{IN}$ is sufficient to forward bias only the first and second LEDs 1402 and 1404, by the third cascode transistor 1427 when the input voltage $V_{IN}$ is sufficient to forward bias only the first, second, and third LEDs 1402, 1404, and 1406, and by the fourth cascode transistor 1429 when the input voltage $V_{IN}$ is sufficient to forward bias all of the first, second, third, and fourth LEDs 1402, 1404, 1406, and 1408.

A person of skill in the art would understand that other commutation schemes such as those disclosed in FIGS. 3 to 12 herein could be adapted to create embodiments of the auto-commutated control circuit 1320 of FIG. 13 that operates as a cascode stage.

Embodiments provide current regulation of DACD LED circuits using a single differential amplifier and an auto-commutated control circuit. A plurality of transistors in the auto-commutated control circuit are respectively coupled between cathodes of a series-connected plurality of LED circuits and a current sense node, and a transistor of the plurality of transistors is selected for use in controlling a magnitude of a current through one or more of the LED circuits according to a magnitude of an input voltage to the series-connected plurality of LED circuits. Each of the LED circuits may comprise one or more series-connected LEDs.

Embodiments of the present disclosure include electronic devices configured to perform one or more of the operations described herein. However, embodiments are not limited thereto.

While illustrative embodiments have been disclosed to aid in the understanding of the disclosure, embodiments are not limited thereto, but are instead limited only by the scope of the appended claims. Embodiment may include various modifications and equivalent arrangements included within the scope of the appended claims. The order of operations described in embodiments is illustrative and may be re-ordered unless otherwise constrained. Further, features of two or more embodiments may be combined to form a new embodiment.

What is claimed is:

1. A circuit comprising:
    an auto-commutated control circuit, the auto-commutated control circuit including a plurality of channels including a first channel and a second channel; and
    an amplifier having an output, the output being coupled to each of the channels of the plurality of channels,
    wherein the auto-commutated control circuit selects a channel to control a current flowing through the auto-commutated control circuit, and
    wherein respective transistors of the channels control respective magnitudes of respective currents of the channels according to the output of the amplifier when the respective channel is selected to control the current flowing through the auto-commutated control circuit, and wherein the first channel includes a first transistor to control a current of the first channel, the first transistor including:
- a first gate terminal coupled to the output of the amplifier,
- a first conduction terminal coupled to a power source through a first load, and
- a second conduction terminal coupled to a first terminal of a blocking diode, wherein the second channel includes a second transistor to control a current of the second channel, the second transistor including:
- a second gate terminal coupled to the output of the amplifier,
- a third conduction terminal coupled to a second terminal of the blocking diode and to the power source through a second load and the first load, and
- a fourth conduction terminal coupled to a current sense node, and wherein the first transistor is turned off in response to a voltage of the third conduction terminal back-biasing the blocking diode, and wherein, when the first transistor is turned on, the current of the first channel flows through the first and second conduction terminals of the first transistor and the blocking diode.

2. The circuit of claim 1, further comprising:
the first load including a first Light Emitting Diode (LED) circuit coupled between the power source and the first channel; and
the second load including a second LED circuit coupled between the first channel and the second channel.

3. The circuit of claim 2, wherein the power source provides rectified Alternating Current (AC).

4. The circuit of claim 1, further comprising:
a current sense resistor coupled between the current sense node and a ground,
wherein a negative input of the amplifier is coupled to the current sense node, and
wherein a positive input of the amplifier is coupled to a reference voltage.

5. A method of controlling respective currents of a plurality of channels of an auto-commutated control circuit, the method comprising:
generating an amplifier output using an amplifier;
providing the amplifier output to respective gate terminals of each of respective transistors of the plurality of channels;
selecting, by the auto-commutated control circuit, a selected channel from among the plurality of channels; and
controlling a magnitude of a current of the selected channel using the transistor of the selected channel and according to the amplifier output, wherein the transistor of a first channel of the plurality of channels has a first conduction terminal coupled to a first terminal of a first load and a first terminal of a second load, and has a second conduction terminal coupled a first terminal of a blocking diode, wherein the transistor of a second channel of the plurality of channels has a third conduction terminal coupled to a second terminal of the second load and to a second terminal of the blocking diode, and has a fourth conduction terminal coupled to a current sense node, wherein the first transistor is turned off in response to a voltage of the third conduction terminal back-biasing the blocking diode, and wherein, when the first transistor is turned on, the current of the first channel flows through the first and second conduction terminals of the first transistor and the blocking diode.

6. The method of claim 5, further comprising:
when the selected channel is the first channel, controlling a magnitude of a current through the first load using a transistor of the first channel and the amplifier output; and
when the selected channel is the second channel, controlling a magnitude of a current through the first load and the second load using a transistor of the second channel and the amplifier output,
wherein the first load is coupled between a power source and the first channel, and
wherein the second load is coupled between the first channel and the second channel.

7. The method of claim 6, further comprising:
providing, using the power source, a rectified Alternating Current (AC) to the first load.

8. The method of claim 6,
wherein a the first load includes a first Light Emitting Diode (LED) circuit, and
wherein the second load includes a second LED circuit.

9. The method of claim 6, further comprising
generating a current sense voltage at the current sense node according to the current through the first load; and
generating the amplifier output according to a difference between the current sense voltage and a reference voltage.

* * * * *